(12) United States Patent
Okano et al.

(10) Patent No.: US 7,450,584 B2
(45) Date of Patent: Nov. 11, 2008

(54) NETWORK REPEATER APPARATUS, NETWORK REPEATER METHOD AND NETWORK REPEATER PROGRAM

(75) Inventors: Tetsuya Okano, Kawasaki (JP); Akira Takeyama, Kawasaki (JP); Toshihiko Naritomi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 554 days.

(21) Appl. No.: 10/957,593

(22) Filed: Oct. 5, 2004

(65) Prior Publication Data

US 2005/0058132 A1    Mar. 17, 2005

Related U.S. Application Data

(63) Continuation of application No. PCT/JP02/04843, filed on May 20, 2002.

(51) Int. Cl.
*H04L 12/28* (2006.01)
(52) U.S. Cl. .................................. 370/392; 370/474
(58) Field of Classification Search ................ 370/389, 370/392, 395.3, 395.1, 395.5, 395.53, 475, 370/474
See application file for complete search history.

(56) References Cited

U.S. PATENT DOCUMENTS 6,181,699 B1 *   1/2001   Crinion et al. ............... 370/392
6,252,888 B1 *   6/2001   Fite et al. ..................... 370/466
7,139,269 B2 *  11/2006   Kalkunte et al. ............. 370/389
7,272,137 B2 *   9/2007   Unitt et al. ................... 370/389

FOREIGN PATENT DOCUMENTS

| JP | 2001-16255 | 1/2001 |
|---|---|---|
| JP | 2001-313663 | 11/2001 |
| JP | 2001-339437 | 12/2001 |
| JP | 2002-73475 | 3/2002 |
| JP | 2002-77275 | 3/2002 |

OTHER PUBLICATIONS

Japanese Office Action dated Sep. 26, 2006 in corresponding Japanese Application No. 2004-506249.

* cited by examiner

*Primary Examiner*—Ricky Ngo
*Assistant Examiner*—Pao Sinkantarakorn
(74) *Attorney, Agent, or Firm*—Staas & Halsey LLP

(57) ABSTRACT

A network repeater apparatus connected to a plurality of networks is provided which includes a VLAN tag addition section (15) or a VLAN tag rewrite section (17) that performs prescribed VLAN tag processing with respect to a communication packet based on prescribed information of the communication packet when the communication packet is input from any one among a plurality of networks, an address translation section (16) that translates a source address of the communication packet based on the prescribed information, and an input and output section (11) that outputs to a prescribed virtual network a communication packet which has been subjected to at least either one of processing by the VLAN tag addition section (15) or the VLAN tag rewrite section (17) or address translation by the address translation part (16), whereby access can be made to a common device while ensuring security between the networks.

9 Claims, 13 Drawing Sheets

FIG. 2

| ITEM | INPUT NETWORK | OUTPUT NETWORK VLAN TAG |
|---|---|---|
| 1 | 1 a | 5 a |
| 2 | 1 b | 5 b |

FIG. 3

| ITEM | DESTINATION ADDRESS | INPUT NETWORK | SOURCE NETWORK ADDRESS | OUTPUT NETWORK VLAN TAG | SOURCE NETWORK ADDRESS AFTER TRANSLATION |
|---|---|---|---|---|---|
| 1 | 6 | 1 a | 1 a-12a | 5 c | 5 c —12 a |
| 2 | 0 | 1 a | 1 a-12a | 5 a | NO TRANSLATION |
| 3 | 6 | 1 b | 1 b-12b | 5 c | 5 c —12 b |
| 4 | 0 | 1 b | 1 b-12b | 5 b | NO TRANSLATION |

FIG. 6

| ITEM | INPUT NETWORK | OUTPUT NETWORK VLAN TAG |
|---|---|---|
| 1 | 2 a | 5 a |
| 2 | 2 b | 5 b |

FIG. 7

| ITEM | DESTINATION ADDRESS | INPUT NETWORK | SOURCE NETWORK ADDRESS | OUTPUT NETWORK VLAN TAG | SOURCE NETWORK ADDRESS AFTER TRANSLATION |
|---|---|---|---|---|---|
| 1 | 6 | 2 a | 2 a-12a | 5 c | 5 c −12 a |
| 2 | 0 | 2 a | 2 a-12a | 5 a | NO TRANSLATION |
| 3 | 6 | 2 b | 2 b-12b | 5 c | 5 c −12 b |
| 4 | 0 | 2 b | 2 b-12b | 5 b | NO TRANSLATION |

FIG. 9

| ITEM | DESTINATION ADDRESS | SOURCE NETWORK ADDRESS | NETWORK VLAN TAG | SOURCE NETWORK ADDRESS AFTER TRANSLATION |
|---|---|---|---|---|
| 1 | 6 | 1 a -12a | 5 c | 5 c —13 a |
| 2 | 6 | 1 b -12b | 5 c | 5 c —13 b |

# NETWORK REPEATER APPARATUS, NETWORK REPEATER METHOD AND NETWORK REPEATER PROGRAM

This application is a continuing application, filed under 35 U.S.C. §111(a), of International Application PCT/JP02/04843, filed May 20, 2002.

TECHNICAL FIELD

The present invention relates to a repeater technique, a security technique and a service providing environment construction technique for communication networks, and more particularly, it relates to a network repeater apparatus, a network repeater method and a network repeater program which are excellent in application to network repeaters such as hubs, switches, bridges, routers and so on, server devices for providing services, distribution devices for distributing access to services, and authentication devices for performing user authentication.

BACKGROUND ART

Under the environments in which there are a plurality of different networks which are undesirable to be mutually accessed from one another for the reasons of security or the like, e.g., environments where there are a plurality of networks in each of units such as organizations like enterprises, schools, etc., or environments where there are a plurality of networks in each of users or communication line providers such as ISPs (Internet Services Providers), wholesale providers (who do not operate ISP business on their own but provide communication lines connecting between users and ISPs), etc., techniques such as VLAN (Virtual Local Area Network), tunneling protocols represented by L2TP (Layer 2 Tunneling Protocol) and so on are widely used for ensuring security between networks.

FIG. 12 is an example of ensuring security by using a VLAN. In this figure, a network 1a and a network 1b are different from each other, so communication packets from a user terminal 12a are output from the network 1a, and communication packets from a user terminal 12b are output from the network 1b. A repeater 19 illustrated severs to repeat communications from the networks 1a, 1b connected thereto. In general, the repeater 19 is a switching hub corresponding to a VLAN or the like and has a function to accommodate packets input thereto from specific ports into the set VLAN. In an example shown in this figure, packets input from the network 1a are accommodated in the virtual network 5a, and packets input from the network 1b are accommodated in the virtual network 5b. According to such a technique, it is possible to sent communication packets to an external network 10 through an externally connected network 18a or 18b, while avoiding mutual access between the network 1a and the network 1b.

FIG. 13 is an example of ensuring security by using L2TP. A repeater 20 in this figure is generally an L2TP-enabled server, an L2TP-enabled switch or the like, and serves to encapsulate packets input thereto under a preset condition and forward them to gateways or server switches existing in prescribed externally connected networks 18a, 18b. In the example illustrated in this figure, packets input from the network 1a are forwarded to the externally connected network 18a by using a layer 2 tunneling 21a, and packets input from the network 1b are forwarded to the externally connected network 18b by using a layer 2 tunneling 21b. According to such a technique, it is possible to sent communication packets to the external network 10 through the externally connected networks 18a and 18b, while avoiding mutual access between the network 1a and the network 1b.

In actuality, wholesale providers provide connection to IPSs or the like using VLANs and tunneling protocols after conducting user authentication and network connection by performing authentication through a PPPoE (PPP over Ethernet) protocol, etc., or authentication through MAC (Media Access Control) addresses, or delivery of IP addresses to connection units by using BASs (Broadband Access Servers), etc.

Although security is ensured in this manner by using the above-mentioned technique in environments where there exit different networks, there are further required devices and/or techniques which enable access to a common device while keeping security between networks without generating unnecessary or wasteful traffic such as transmission by way of external networks as well as without performing complicated settings such as setting a plurality of discrete addresses to a device to be accessed.

When access is made to a common device from networks in a state where security is ensured between the networks, there are the following conventional methods: a method in which each of the networks is once returned to a state where security is not ensured or in which the common device is provided with a plurality of security-equipped interfaces corresponding to the addresses of the networks, respectively; a method of accessing the common device by way of external networks: and a method of accessing the common device with address translation being carried out by a gateway installed for each of the networks.

FIG. 14 is a view that illustrates a technique of returning a network to a state thereof where security is not ensured temporarily. In this figure, there is illustrated the case where routing from a VLAN to a network 23 through a router 22 is carried out in order to make access from the VLAN to a device 6 that is a common access destination. Under such a condition, securities of a virtual network 5a and a virtual network 5b are not kept.

FIG. 15 is a view that illustrates a technique in which a common device is provided with a plurality of security-equipped interfaces corresponding to the addresses of networks, respectively. In this figure, it is configured that in order to enable access from a VLAN to a device 6 that is a common access destination, the device 6 is provided with an interface 24a for a virtual network 5a and an interface 24b for a virtual network 5b. In this case, it is necessary to allocate the addresses belonging to the virtual networks 5a, 5b to the interfaces 24a, 24b. In this configuration, a DNS (Domain Name System server (not shown) for returning different addresses to input networks, respectively, is needed, but it is difficult for a general DNS server to change the addresss to be answered according to inquiry sources. In addition, a technique of providing a DNS server for each ISP can be considered, but it will not be practical.

FIG. 16 is a view that illustrates a technique of making access through an external network. In this configuration, the address of a device 6, being a common access destination, becomes one that is unrelated to input networks unlike the case of FIG. 15. In this case, however, communication packets flow through wasteful or unnecessary routes. That is, wasteful or unnecessary traffic is generated and throughput is reduced. In cases where this technique is applied to wholesale providers, the quality of services cannot be maintained because of the intervention of low-quality external networks, unlike networks comprising high-speed communication lines within the premises of the wholesale providers.

The present invention is intended to solve the problems as referred to above, and is intended to provide a network repeater apparatus, a network repeater method and a network repeater program which are capable of making access to a common device while keeping the security of networks.

DISCLOSURE OF THE INVENTION

The present invention provides a network repeater apparatus comprising: a network repeater connected to a plurality of networks; a VLAN tag processing part that performs prescribed VLAN tag processing with respect to a communication packet based on prescribed information of the communication packet when the communication packet is input from any one among the plurality of networks; a first address translation part that translates a source address of the communication packet based on the prescribed information; and a first output part that outputs to a prescribed virtual network a communication packet which has been subjected to at least either one of processing by the VLAN tag processing part or address translation by the first address translation part.

According to such a configuration, even in cases where security between the networks is ensured by the use of a VLAN, it becomes possible to make access to a common device from each network by performing processing corresponding to the common device on the communication packet for its VLAN tag as well as appropriate processing on its source address. In addition, according to conventional methods, when access is made to a common device, it is necessary for the common device to provide a plurality of interfaces or a plurality of network addresses, or complicated settings such as conducting a plurality of settings in a DNS server for name resolution, or it is necessary to access the common device by way of an external network. In contrast to this, according to the present invention, such complicated settings are unnecessary and there is no need to pass through an external network, so it is possible to prevent the generation of unnecessary or wasteful traffic as well as the reduction in throughput.

Here, note that in a preferred embodiment of the present invention, the VLAN tag processing part is constituted by a VLAN tag addition section or a VLAN tag rewrite section of the repeater, and the first address translation part is constituted by an address translation section, and the first output part is constituted by an input and output section. Also, in a preferred embodiment, the prescribed information is stored in a storage section of the repeater.

Moreover, in the network repeater apparatus according to the present invention, the VLAN tag processing part is provided with a VLAN tag addition part that adds a prescribed VLAN tag to the input communication packet.

According to such a configuration, even in case of a communication packet from a network that is not compatible with the virtual network, it can be output to the virtual network by adding thereto a VLAN tag. As a result, the common device can be accessed while ensuring security. In a preferred embodiment of the present invention, the VLAN tag addition part corresponds to a VLAN tag addition section.

Further, in the network repeater apparatus according to the present invention, the VLAN tag processing part is provided with a first VLAN tag rewrite part that rewrites the VLAN tag, which has already been added to the input communication packet, into a prescribed VLAN tag when a source network of the input communication packet is a virtual network using VLAN tags.

According to such a configuration, it is possible to make an appropriate VLAN tag to be added to the communication packet regardless of whether the input network is an ordinary network or a virtual network. As a result, security can be ensured in a reliable manner. In a preferred embodiment of the present invention, the VLAN tag rewrite part corresponds to a VLAN tag rewrite section or a first VLAN tag rewrite section.

Furthermore, in the network repeater apparatus according to the present invention, the prescribed information is at least either one of information on a source network of the communication packet or information on a destination of the communication packet.

According to such a configuration, the VLAN tag can be added or rewritten in accordance with whether the destination of the communication packet is a commonly accessible device. As a result, the common device can be accessed in a reliable manner.

Still further, in the network repeater apparatus according to the present invention, when the destination of the communication packet is a device which is commonly accessed by the plurality of networks, the VLAN tag addition part adds a VLAN tag corresponding to the device to the communication packet.

According to such a configuration, a tag of the virtual network accommodating the common device can be added to the communication packet. As a result, the communication packet can be sent to the common device in a reliable manner while ensuring security.

In addition, in the network repeater apparatus according to the present invention, when the destination of the communication packet is a device which is commonly accessed by the plurality of networks, the first address translation part translates the source address of the communication packet into an address which makes a network corresponding to the device set to be a source network.

According to such a configuration, the source address of the communication packet can be made as the address of a virtual network accommodating the common device. As a result, the common device can be accessed in a reliable manner while ensuring security.

Moreover, in the network repeater apparatus according to the present invention, the first address translation part is installed in a prescribed external device; and the external device includes: an input part to which the communication packet output by the first output part is input; a second VLAN tag rewrite part that rewrites a VLAN tag already added to the input communication packet into a prescribed VLAN tag based on the prescribed information of the communication packet input by the input part; and a second output part that outputs to the prescribed virtual network a communication packet which has been subjected to at least either one of the processing by the VLAN tag processing part and the address translation by the first address translation part; wherein the first address translation part translates the source address of the communication packet input by the input part.

According to such a configuration, address translation processing, which loads the system, can be externally added so that reduction in transit or pass-through performance can be prevented. Particularly, this configuration is very effective in nodes or junctions of large scale networks at which high transit or pass-through performance is demanded. Also, it is possible to deal with the speed-up of the networks to a satisfactory extent. In a preferred embodiment of the present invention, the input part and the second output part correspond to an input and output section, and the second VLAN tag rewrite part corresponds to a VLAN tag rewrite section or a second VLAN tag rewrite section.

In addition, the network repeater apparatus according to the present invention further comprises: a storage part that stores the addresses before and after the translation by the first address translation part in association with each other; and a second address translation part that translates a destination of a reply packet to the communication packet based on data stored in the storage part.

Further, in the network repeater apparatus according to the present invention, the second address translation part translates a destination of a reply packet to the communication packet into the address before the translation stored in the storage part.

According to such a configuration, when a communication packet is to be sent from the common device to a source user terminal for the communication packet, it can be output to the source network after the source address (destination address) of the communication packet has been returned to the address before the translation. As a result, the communication packet can be delivered to the source user terminal in a reliable manner. In a preferred embodiment of the present invention, the storage part is constituted by a storage section, and the second address translation part is constituted by an address translation section.

Furthermore, in the network repeater apparatus according to the present invention, the storage part and the second address translation part are installed in a predetermined external device.

According to such a configuration, the address translation processing, loading the system, can be externally added, so reduction in transit or pass-through performance can be prevented. In particular, this configuration is very effective in nodes or junctions of large scale networks at which high transit or pass-through performance is demanded. Additionally, it is possible to deal with the speed-up of the networks to a satisfactory extent.

Still further, in the network repeater apparatus according to the present invention, the plurality of networks include a virtual network.

According to such a configuration, the apparatus can smoothly carry out the processing of ensuring security as well as tag processing or address translation processing for accessing the common device flexibly in compliance with a variety of networks without regard to actual networks or virtual networks, so it is highly versatile.

Besides, the network repeater apparatus according to the present invention further comprises: an authentication part that authenticates, upon input of a communication packet from any one among the plurality of networks, a user of the source of the communication packet in each network.

According to such a configuration, the network repeater apparatus can directly receive a connection request from a user terminal and perform an authentication operation. As a result, communication packets can be immediately accommodated into the virtual network from the user terminal, so the load on the input network side is reduced. For example, in wholesale providers or the like, security is conventionally ensured consistently from the time of authentication by integrating user authentication functions, but when a common device is accessed, it is necessary to adopt a technique of providing an interface for each network in the common device or it is necessary to release the security once ensured. With this configuration, however, such a problem can be solved, thus making it possible to ensure security and access the common device more easily. In a preferred embodiment of the present invention, the authentication part corresponds to an authentication section.

In addition, the present invention provides a network repeater method comprising: a VLAN tag addition step of adding a prescribed VLAN tag to a communication packet based on prescribed information of the communication packet when the communication packet is input from any one among a plurality of networks; a VLAN tag rewrite step of rewriting, when a VLAN tag has already been added to the communication packet, the VLAN tag based on the prescribed information; a first address translation step of translating a source address of the communication packet based on the prescribed information; and an output step of outputting to a prescribed virtual network a communication packet which has been subjected to processing in at least either one of the VLAN tag addition step, the VLAN tag rewrite step and the address translation step.

Moreover, in the network repeater method according to the present invention, when the destination of the communication packet is a device which is commonly accessed by the plurality of networks, the VLAN tag added in the VLAN tag addition step or the VLAN tag translated in the VLAN tag rewrite step becomes a VLAN tag corresponding to the device.

Further, in the network repeater method according to the present invention, when the destination of the communication packet is a device which is commonly accessed by the plurality of networks, the source address of the communication packet is translated, in the first address translation step, into an address which makes a network corresponding to the device set to be a source network.

Furthermore, the network repeater method according to the present invention further comprises: a storage step of storing the addresses before and after the translation in the first address translation step in a prescribed storage area in association with each other; and a second address translation step of translating, upon input of a reply packet to the communication packet, a destination of the reply packet to the communication packet based on data stored in the storage area.

Still further, the present invention provides a network repeater program stored in a computer readable medium for making a computer execute network repeating processing including adding a prescribed VLAN tag to a communication packet based on prescribed information of the communication packet when the communication packet is input from any one of a plurality of networks; and rewriting, when a VLAN tag has already been added to the communication packet, the VLAN tag based on the prescribed information. The network repeating processing includes executing a first address translation including translating a source address of the communication packet based on the prescribed information; and outputting to a prescribed virtual network a communication packet which has been subjected to processing in at least either one of adding the VLAN tag, rewriting the VLAN tag and translating the address.

In addition, according to the disclosed network repeater program, when the destination of the communication packet is a device which is commonly accessed by the plurality of networks, the VLAN tag added, or the VLAN tag translated, becomes a VLAN tag corresponding to the device.

In addition, according to the disclosed network repeater program, when the destination of the communication packet is a device which is commonly accessed by the plurality of networks, the source address of the communication packet is translated, in the first address translation, into an address which makes a network corresponding to the device set to be a source network.

Moreover, the disclosed network repeater program causes the computer to perform operations including storing the addresses before and after the translation in the first address translation in a prescribed storage area in association with each other; and executing a second address translation including translating, upon input of a reply packet to the communication packet, a destination of the reply packet to the communication packet based on data stored in the storage area.

Here, note that in the present invention, the computer readable recording medium includes a portable storage medium such as a CD-ROM, a flexible disk, a DVD disk, a magneto-optical disk, an IC card or the like, or a database that holds therein computer programs, or another computer and its database, or a transmission medium on a communication line.

BRIEF DESCRIPTION OF THE DRAWINGS

FIG. 2 is one example of setting information on VLAN tags according to the first embodiment.

FIG. 3 is one example of setting information on VLAN tags and their addresses according to the first embodiment.

FIG. 6 is one example of setting information on VLAN tags according to the second embodiment.

FIG. 7 is one example of setting information on VLAN tags and their addresses according to the second embodiment.

FIG. 9 is one example of setting information on VLAN tags and their addresses according to the third embodiment.

BEST MODE FOR CARRYING OUT THE INVENTION

Now, preferred embodiments of the present invention will be described below in detail while referring to the accompanying drawings.

Embodiment 1

Figure 1:
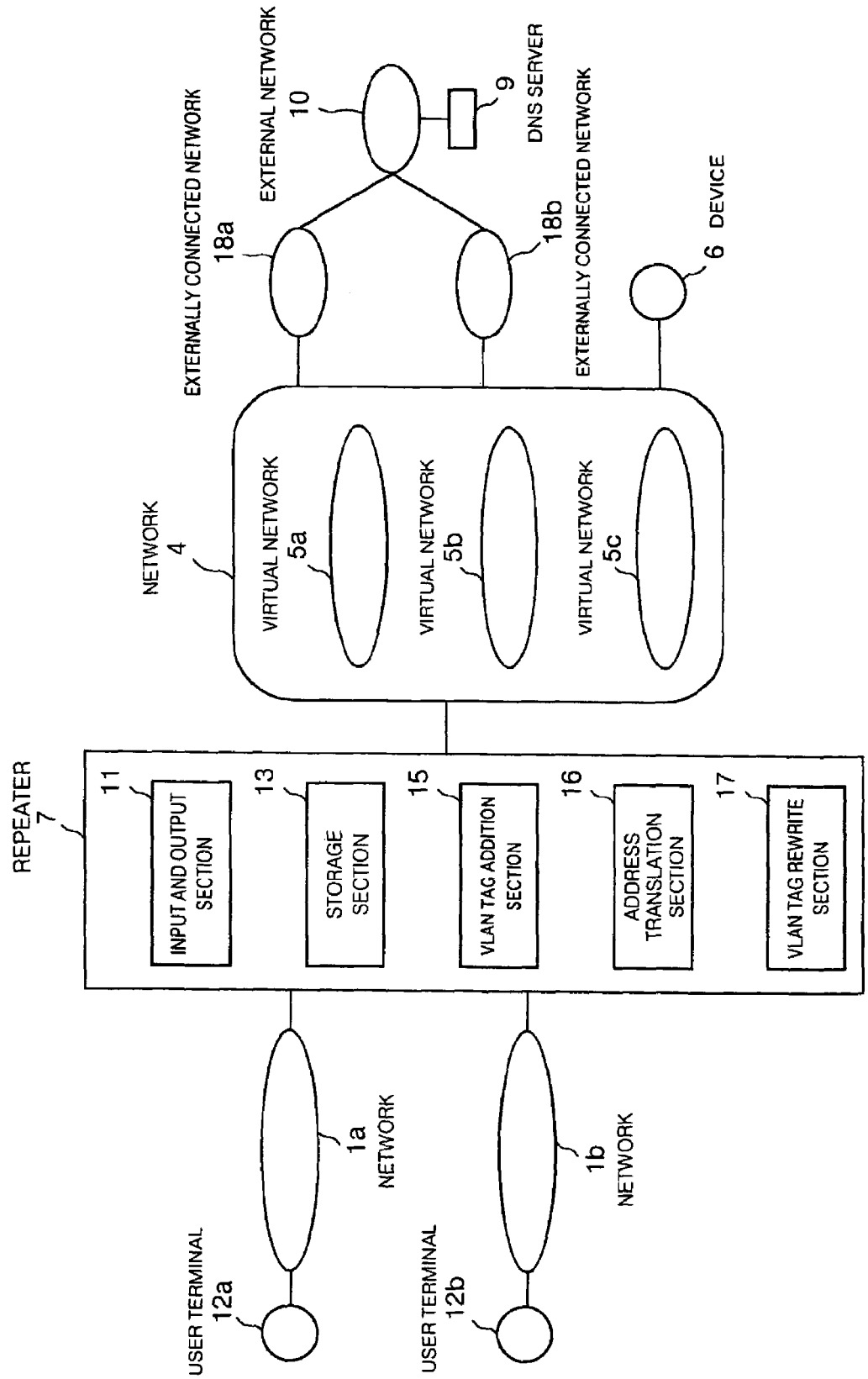
FIG. 1 is a view showing the outline of a network repeater technique according to a first embodiment of the present invention.
Figure 12:
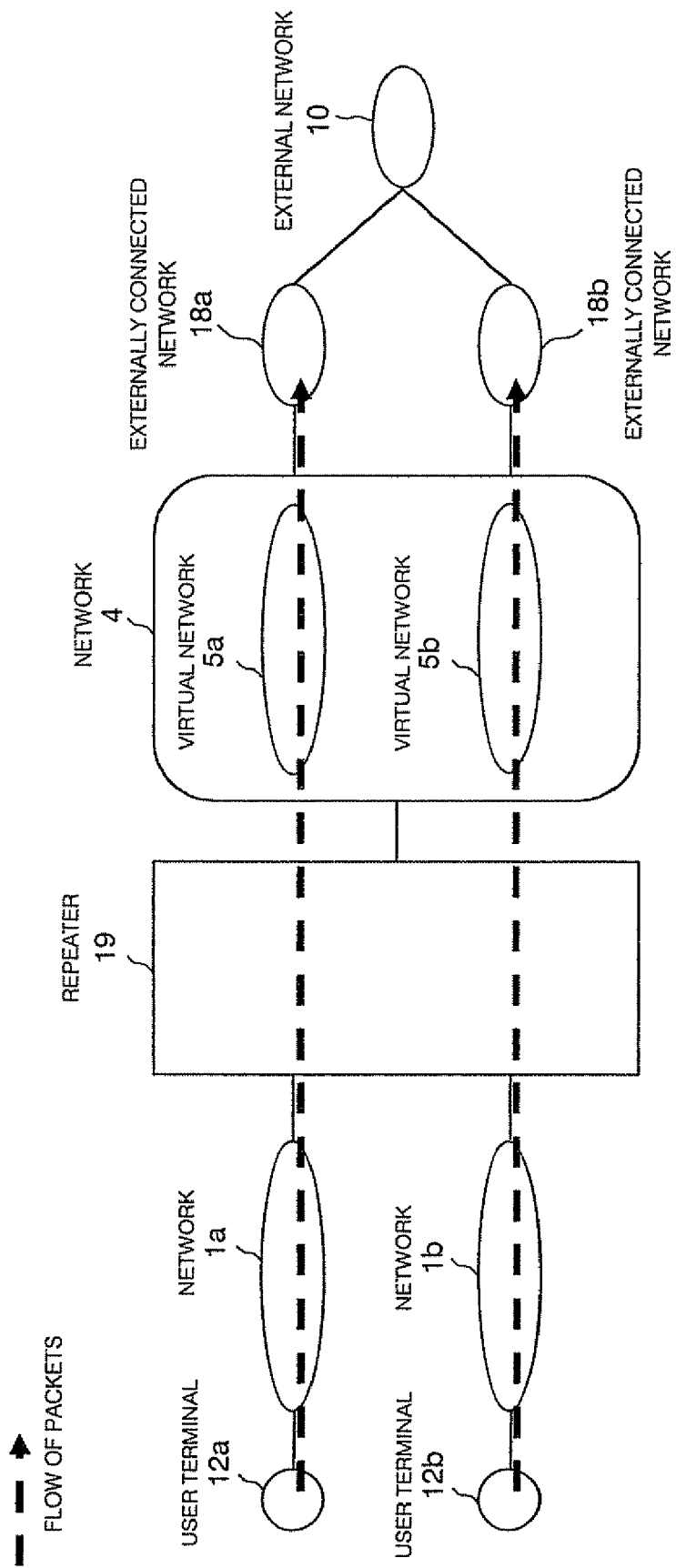
FIG. 12 is one example of a known technique ensuring security by using a VLAN.
Figure 13:
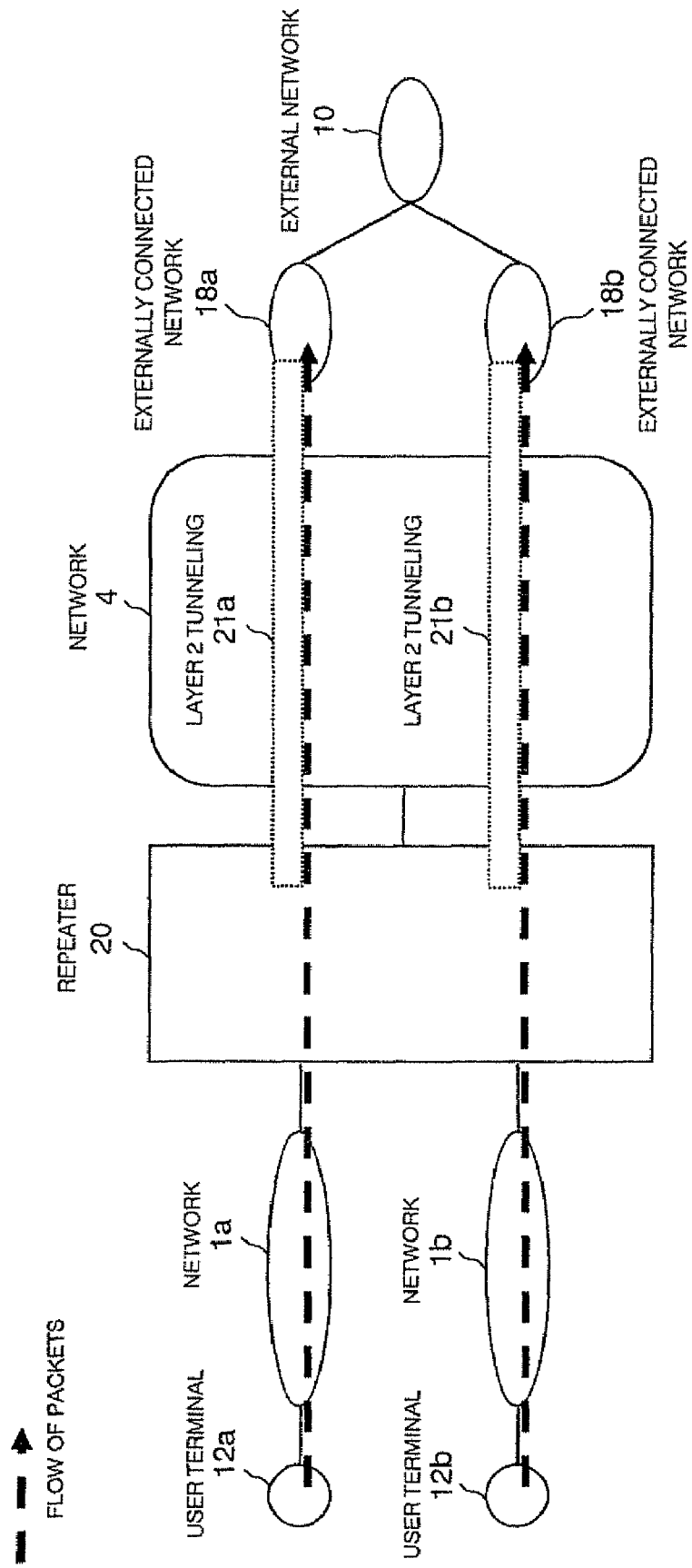
FIG. 13 is one example of a known technique ensuring security by using L2TP.
Figure 14:
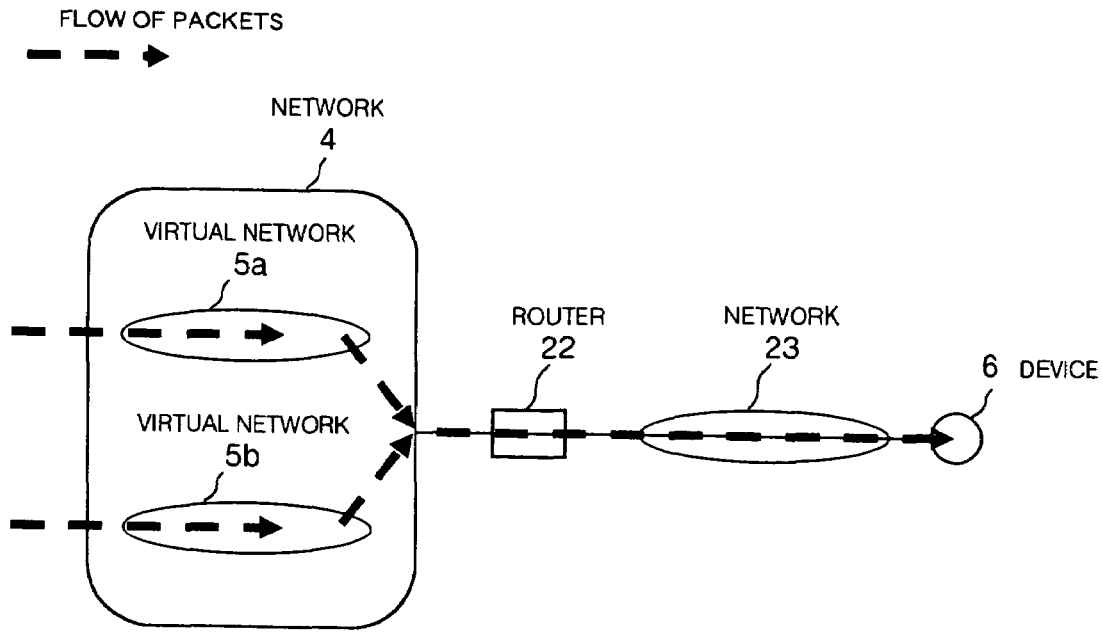
FIG. 14 is a view showing a technique of returning a network to a state thereof where security is not ensured temporarily so as to enable access to a common device.
Figure 15:
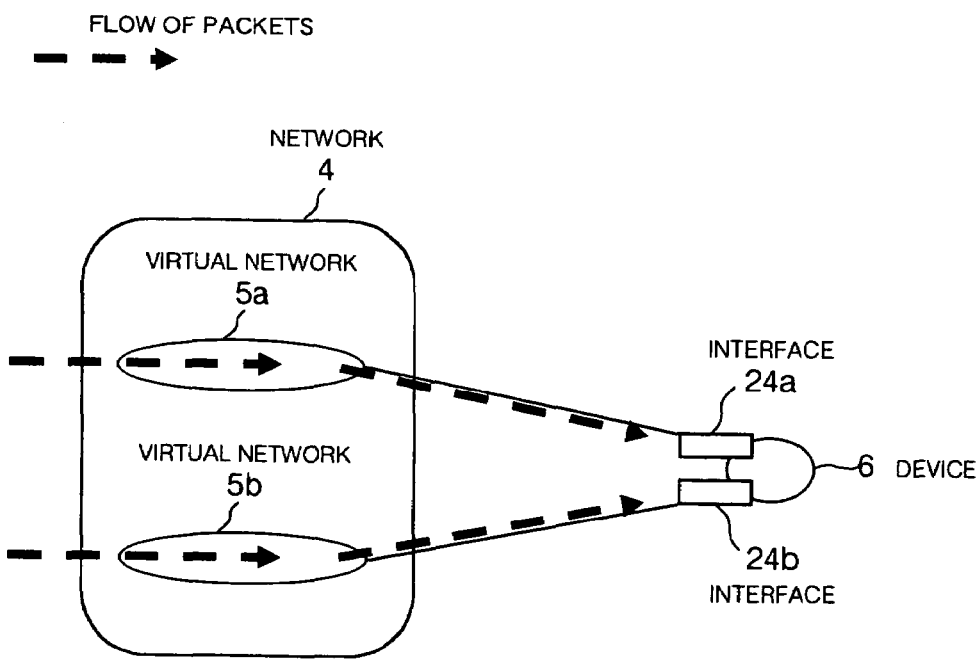
FIG. 15 is a view showing a technique of providing a common device with a plurality of security-equipped interfaces corresponding to the addresses of networks, respectively.
Figure 16:
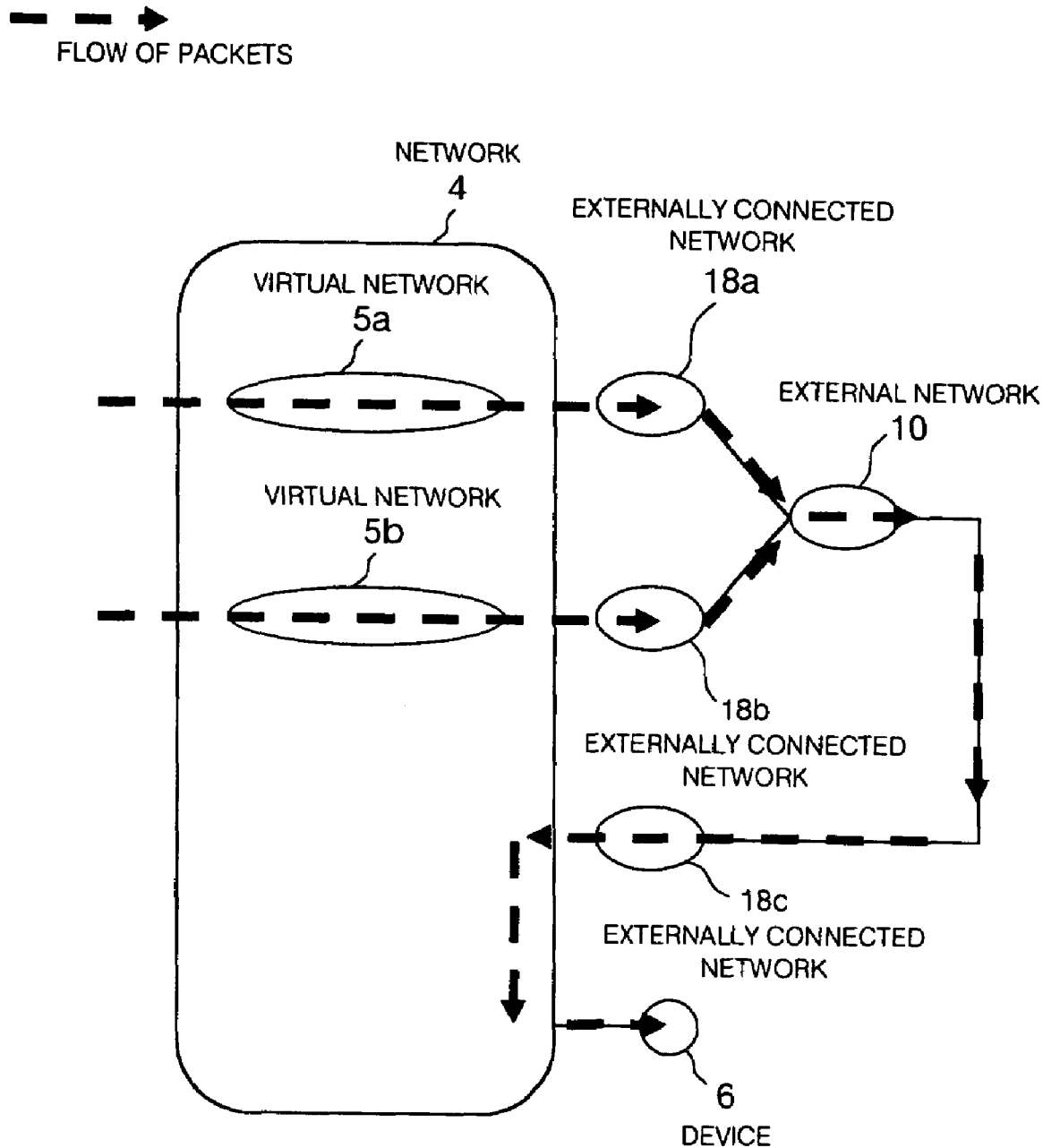
FIG. 16 is a view showing a technique of accessing a common device through an external network.

FIG. 1 is a view that shows the outline of a network repeater technique according to a first embodiment of the present invention. This view illustrates a configuration similar, except for a repeater, to the above-mentioned one of FIG. 12 showing the prior art. As shown in this figure, the repeater 7 includes an input and output section 11 in the form of an I/O interface between a variety of networks, a storage section 13 that stores various data, a VLAN tag addition section 15 that adds VLAN tags to input communication packets, an address translation section 16 that translates the source addresses of input communication packets, and a VLAN tag rewrite section 17 that rewrites VLAN tags added by the VLAN tag addition section 15.

Describing the outline of the processing according to this embodiment, communication packets from networks 1a, 1b connected to the repeater 7 are distributed to virtual networks 5a, 5b, as shown in FIG. 1. When the destination of each communication packet is a commonly accessed device 6 upon such distribution, the communication packets are distributed to a virtual network 5c, and the source addresses thereof are changed to the address of the virtual network 5c, whereby the communication packets to the device 6 are separated as the virtual network 5c from the other networks, so that user terminals 12a, 12b are able to access the device 6. In addition, the communication packets from the device 6 to the sources are returned to the repeater 7, which rewrites the destinations of those communication packets by making the changed addresses as source addresses, and outputs the communication packets to the original or source network 1a or 1b.

Hereinafter, a concrete technique therefor will be described. When access is made to the common the device 6 from the user terminal 12a or 12b, first of all, an inquiry for name resolution is made from a user terminal side to a DNS server 9, and the DNS server 9 existing on an external network 10 sends, as an answer, the address of the device 6 to the user terminal that has made the inquiry. Then, the user terminal 12a or 12b starts making access to the address acquired from the DNS server 9. Here, note that the address is expressed as "a belonging network terminal number" (e.g., "5c-6" in FIG. 1).

When the repeater 7 acquires a communication packet from the network 1a or 1b through the input and output section 11, the VLAN tag addition section 15 determines the VLAN tag of a virtual network based on the setting information stored in the storage section 13, and adds or attaches the VLAN tag to the communication packet. FIG. 2 illustrates one example of such setting information. For example, if the communication packet came from the network 1a, the VLAN tag addition section 15 acquires the data (5a) stored in the corresponding item of "VLAN tag for output network" by making reference to the record of the input network 1a in FIG. 2, and adds it to the communication packet as a VLAN tag.

Subsequently, the VLAN tag translation section 17 verifies the destination address of the communication packet, and rewrites the VLAN tag thus added on the basis of the setting information stored in the storage section 13. FIG. 3 illustrates one example of such setting information. For example, assuming that the input network of the communication packet is 1a and the destination address thereof is the address of the device 6 (e.g., "6" in FIG. 3), the data (5c) stored in the corresponding item of the output network VLAN tag is acquired with reference to the pertinent record (e.g., item "1" in FIG. 3). Then, the VLAN tag rewrite section 17 rewrites the VLAN tag into 5c. Here, note that destination addresses "0" shown in items 2 and 4 in FIG. 3 mean the addresses of arbitrary terminals other than the device 6. When the destination address is 0, the VLAN tag added by the VLAN tag addition section 15 can be used as it is, and hence rewrite processing is not performed.

In addition, the address translation section 16 rewrites the source address of the communication packet based on the relations in FIG. 3. For example, when the destination address of the communication packet is verified to be the address of the device 6 (e.g., "6" in FIG. 1), the source address thereof is rewritten with the address of the virtual network that the device 6 belongs to. Specifically, with respect to a communication packet having its destination address of 6 and its input network of 1a in FIG. 3, its source address of "5c-2a" is rewritten (translated) into "5c-12a".

With this VLAN tag and the address thus translated, the communication packet to the device 6 output from the repeater 7 passes through the virtual network 5c to reach the device 6.

Moreover, the communication packet from the device 6 to the user terminal 12a or 12b is input to the repeater 7 after passing through the virtual network 5c. In the address translation section 16 of the repeater 7, the address of the original user terminal (source network address in FIG. 3) is retrieved for the input communication packet from the setting information in FIG. 3, so that the destination address thereof is rewritten. Also, the VLAN tag addition section 15 removes the VLAN tag added to the communication packet. Here, the communication packet is output from the input and output section 11 to the source network. If stated with the above-mentioned example, the address translation section 16 rewrites the destination address from the translated source network address (5c-12a) into the original source network address (1a-12a). In addition, the VLAN tag addition section 15 deletes the VLAN tag 5c, and the input and output section 11 outputs the packet to the network 1a.

According to the above-mentioned processing, the securities of the networks 1a and 1b are held and at the same time the common device can be accessed.

Although in this embodiment, the processing is carried out by using both FIG. 2 and FIG. 3, the VLAN tag can be directly determined by using FIG. 3 alone. In this case, FIG. 2 is not needed.

Further, the setting information is not limited to the form as illustrated in FIG. 3, but when the addresses before and after the translation become different from each other according to the translation processing of the address translation section 16, it is necessary to internally hold a table of their correlation. Here, note that in cases where data becomes unnecessary such as where all the communications have been completed or an error has occurred, the pertinent items in the correlation table can be deleted.

Figure 4:
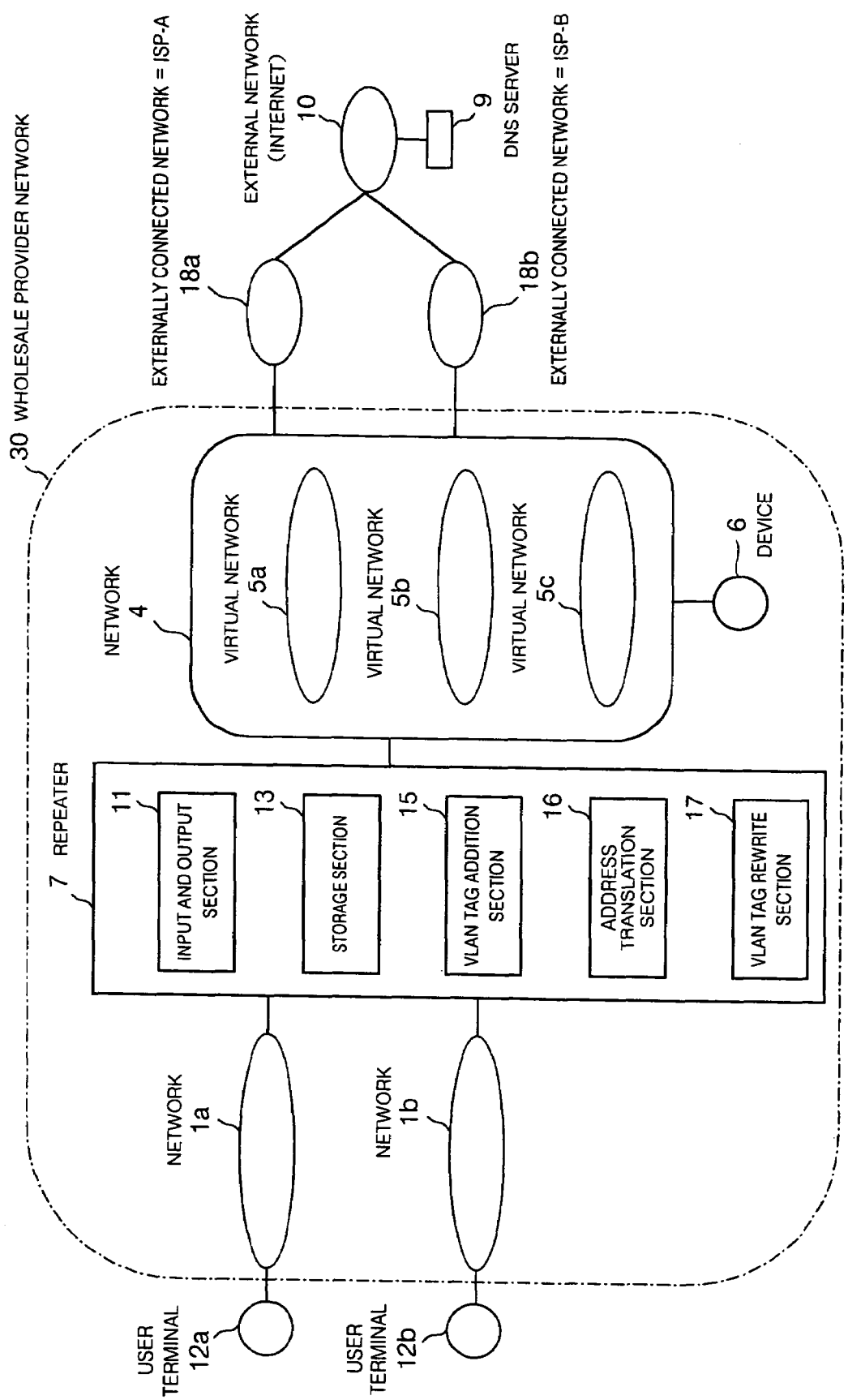
FIG. 4 is a view when the network repeater technique of FIG. 1 is applied to a wholesale provider.

FIG. 4 is a view when the network relay technique of FIG. 1 is applied to a wholesale provider. Those portions enclosed with a dotted line in the figure is a network 30 of the wholesale provider. Here, let us assume that a user having a user terminal 12a contracts with an ISP-A (externally connected network 18a) and another user having a user terminal 12b contracts with an ISP-B (externally connected network 18b). The ISP-A and the ISP-B are respectively connected to the Internet (external network 10). The wholesale provider serves to provide line connections between the ISP-A, the ISP-B and the users.

The user terminal 12a of the ISP-A and the user terminal 12b of the ISP-B, being different in their contracted ISPs, exist on networks of mutually different addressing systems. In addition, it is not possible from the point of view of security that the user of the ISP-A and the user of the ISP-B are made to coexist on the same network so as to permit mutual access to be made thereon in the wholesale provider. Accordingly, security is ensured herein by accommodating the users in virtual networks 5a, 5b for the individual ISPs, respectively. The virtual networks 5a, 5b have their gateways for the ISP-A and the ISP-B, respectively, which are connected to the respective ISPs.

In cases where the wholesale provider provides services from the common device 6 to the users who contract with the provider, in order to enable the device 6 to be accessed so as to accommodate the users in the virtual networks different according to the individual ISPs while keeping network security, according to conventional techniques, the device 6 has to be connected to the individual virtual networks with separate addresses, respectively, or the device 6 has to once access the individual virtual networks by way of an external network (the Internet). According to the present invention, however, by properly adding a VLAN tag to a communication packet input to the repeater and translating the source address thereof, it is possible to make access to the common device while keeping security between the networks without generating unnecessary traffic due to passing through external networks as well as without performing complicated settings such as setting a plurality of discrete addresses in devices to be accessed.

Embodiment 2

This embodiment is substantially similar in configuration to the first embodiment, but shows the case where connected networks are virtual networks. Specifically, the connected networks are already virtual networks, so communication packets not addressed to a common device can be output to the same virtual network as an input network, but they can of course be translated into new virtual networks.

Figure 5:
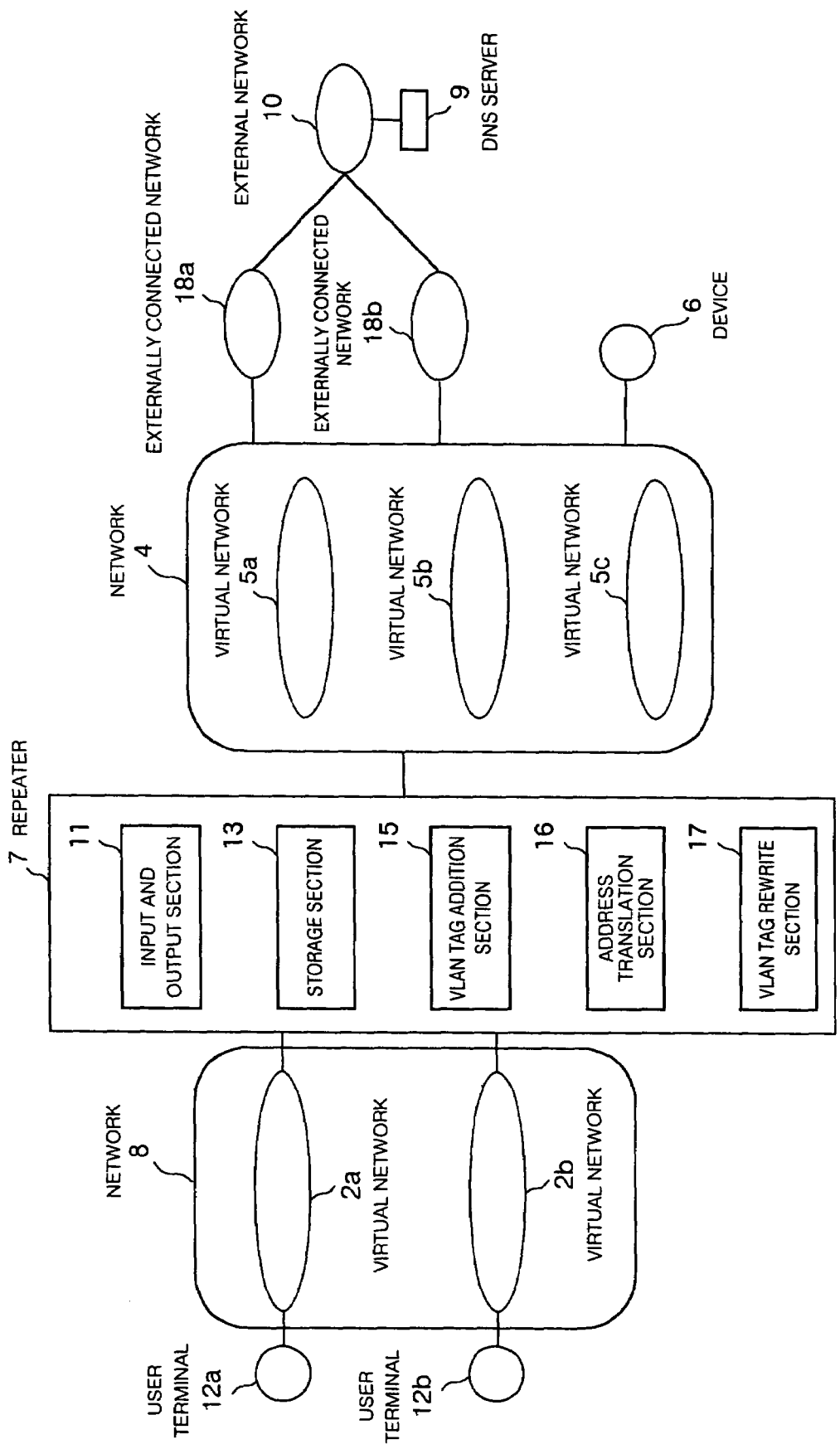
FIG. 5 is a view schematically showing the outline of a network repeater technique according to a second embodiment of the present invention.

FIG. 5 is a view that schematically illustrates this embodiment.

A VLAN tag addition section 15 of a repeater 7 verifies whether a VLAN tag has already been added to an input communication packet. If networks 2a, 2b in the figure are virtual networks to which VLAN tags have already been added or attached, it is determined that VLAN tags were added to these networks, and tag addition processing is not performed. Here, note that the VLAN tag is not rewritten when the communication packet is output to the same virtual network as the input network, whereas the VLAN tag is rewritten by the VLAN tag rewrite section 17 when the communication packet is output to a different virtual network. This rewrite processing is performed, for example, by using a table in FIG. 6 stored in a storage section 13.

In the case of a virtual network using no VLAN tag, a VLAN tag is added by using the setting information of FIG. 6 stored in the storage section 13.

Subsequently, the VLAN tag rewriting processing of the VLAN tag rewrite section 17 and the address translation processing of the address translation section 16 are carried out by using the setting information of FIG. 7, but these processings are similar to those in the above-mentioned first embodiment and hence an explanation thereof is omitted.

When the input network is a network already added with a VLAN tag, the VLAN tag rewrite section 17 verifies the already added VLAN tag and rewrites it properly, but communication packets not addressed to a common device can be output to the same virtual network as an input network (i.e., tag rewrite processing is not performed). In this case, the table or setting information in FIG. 6 is unnecessary. Of course, communication packets can be translated into new virtual networks, and in this case, the VLAN tag rewrite section rewrites the VLAN tag by using the table or setting information in FIG. 6 or FIG. 7.

Here, note that the VLAN tag addition section 15 can arbitrarily perform determining such destination the virtual network. Specifically, it is determined whether communication packets are distributed to a VLAN according to each network (e.g., communications from the network 2a are distributed to the virtual network 5a, and communications from the network 2b are distributed to the virtual network 5b) or whether communication packets are distributed to the original virtual networks (2a, 2b).

In addition, even if there exist both actual networks and virtual networks in the networks connected to the repeater 7, appropriate network repeating operation can be carried out by using the above-mentioned technique.

Embodiment 3

In this embodiment, reference will be made to the case where among the above-mentioned functions of the repeater apparatus, a part having the function of the VLAN tag addition section and a part having the function of the address translation section and the function of the VLAN tag rewrite section are provided as mutually separate devices for performing network repeating operation.

Figure 8:
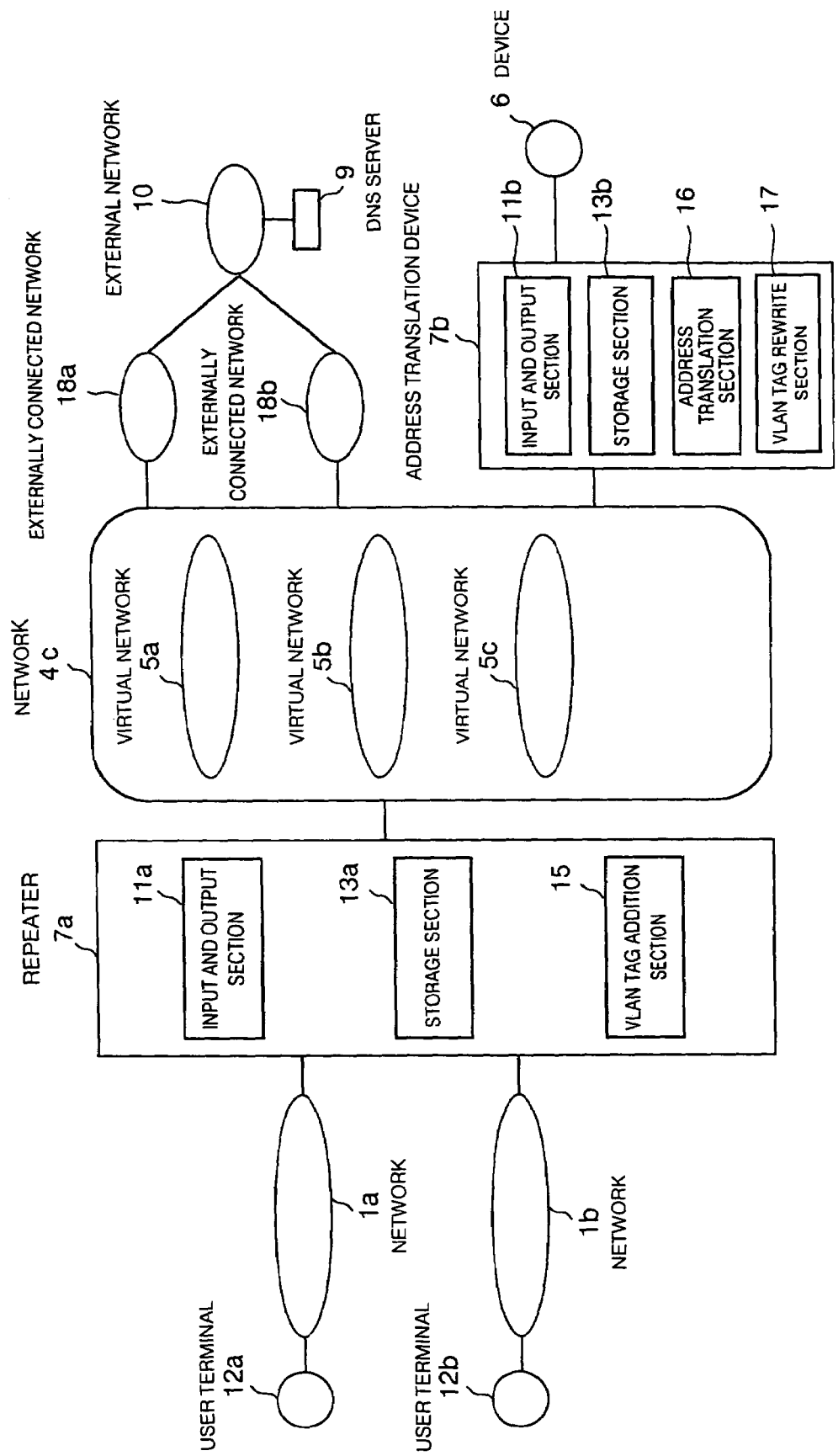
FIG. 8 is a view schematically showing the outline of a network repeater technique according to a third embodiment of the present invention.

FIG. 8 is a view that schematically illustrates this embodiment.

The configuration of this embodiment is similar to that of FIG. 1 other than the repeater. The repeater 7 in FIG. 1 corresponds to a repeater 7a and an address translation device 7b in FIG. 8. As illustrated in these figures, the repeater 7a includes an input and output section 11a, a storage section 13a and a VLAN tag addition section 15. The address translation device 7b includes an input and output section 11b, a storage section 13b, an address translation section 16 and a VLAN tag rewrite section 17.

The technique of this embodiment will be described in detail by using the above-mentioned configuration.

The processing until a communication packet is input from the network 1a or 1b to the repeater 7 is similar to the first embodiment, and hence an explanation thereof is omitted. When the communication packet is input to the repeater 7a, the VLAN tag addition section 15 adds a VLAN tag to the communication packet based on the setting information stored in the storage section 13a. The setting information is similar to that in FIG. 2. At the time when the VLAN tag is added to the communication packet, the communication packet is output from the input and output section 11a.

The communication packet output from the repeater 7a is output onto virtual networks, and at that time it is input to the address translation device 7a. Here, note that all the communication packets output from the repeater 7a are once processed by the address translation device 7b. In case where the destination of each communication packet is a commonly accessed device 6, Based on the setting information stored in the storage section 13b, the VLAN tag rewrite section 17 of the address translation device 7b rewrites the VLAN tag of each communication packet into a virtual network 5c, and the address translation section 16 changes the source address thereof to the address of the virtual network 5c. One example of such setting information is shown in FIG. 9. Here, note that in case where the destination is not the common device 6, no processing is performed in the address translation device 7b.

Thus, the communication packets to the device 6 are separated as the virtual network 5c from the other networks, so that they are able to access the device 6 from the network 1a or the network 1.

Since the communication packets from the device 6 to the source return to the address translation device 7b, the address translation section 16 rewrites the destinations thereof into the source addresses by making reference to the data in FIG. 9, and outputs the communication packets to the virtual networks 5a, 5b. At this point, the VLAN tags are not deleted.

When the communication packets are input to the repeater 7a through the virtual networks, the VLAN tag addition section 15 deletes the VLAN tags, and the communication packets are output from the input and output section 11a to the original network 1a or 1b.

Thus, the transit performance is improved by separating the function of the address translation section. In particular, at nodes or junctions between large scale networks, high transit performance is required, but processing, which imposes a load on the repeater, such as address translation or the like might cause reduction in the transit performance. Therefore, by externally installing such processing, it becomes possible to maintain the transit performance high.

Embodiment 4

This embodiment is substantially similar in configuration to the first embodiment, but shows the case where connected networks are virtual networks. Specifically, the connected networks are already virtual networks, so communication packets not addressed to a common device can be output to the same virtual network as an input network, but they can of course be translated into new virtual networks.

Figure 10:
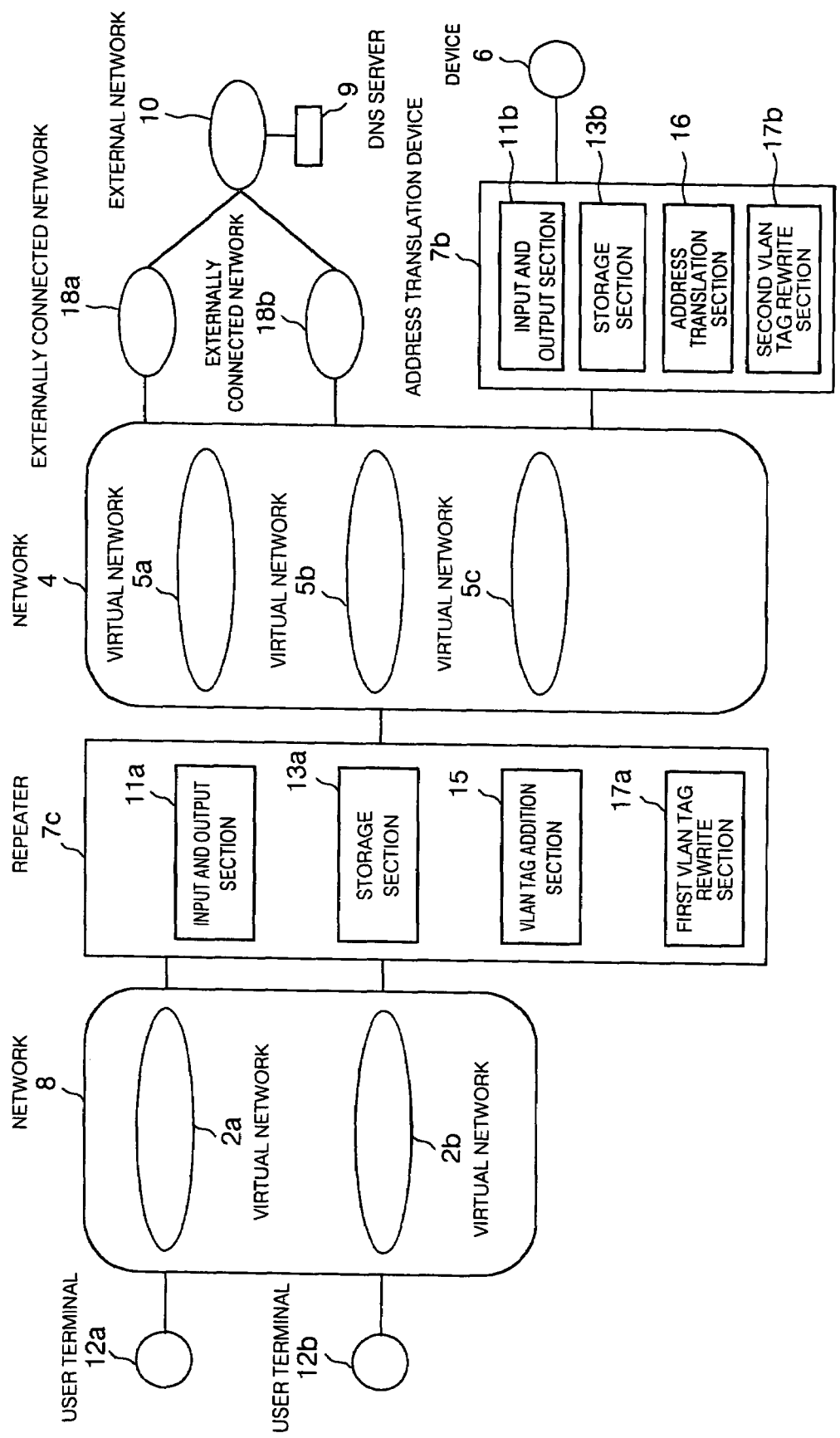
FIG. 10 is a view schematically showing the outline of a network repeater technique according to a fourth embodiment of the present invention.

FIG. 10 is a view that schematically illustrates this fourth embodiment.

A repeater 7c includes a VLAN tag addition section 15 and a first VLAN tag rewrite section 17a, and an address translation device 7d includes an address translation section 16 and a second VLAN tag rewrite section 17b. Here, let us assume that the first VLAN tag rewrite section 17a and the second VLAN tag rewrite section 17b perform the same processing as that of the VLAN tag rewrite section 17 of the above-mentioned embodiments.

The VLAN tag addition section 15 of the repeater 7c verifies whether a VLAN tag has already been added to an input communication packet. If the networks 2a, 2b in the figure are virtual networks to which VLAN tags have already been added or attached, it is determined that VLAN tags were added to these networks, and tag addition processing is not performed. Here, note that when the communication packet is output to the same virtual network as the input network, the rewriting of the VLAN tag is not performed, whereas when the communication packet is output to a different virtual network, the rewriting of the tag is carried out by the first VLAN tag rewrite section 17a. This rewrite processing is performed, for example, by using the table in FIG. 6 stored in the storage section 13a.

Moreover, when the input network is a virtual network using no VLAN tag, a VLAN tag is added by using the setting information of FIG. 6 stored in the storage section 13a.

When the VLAN tag addition and rewrite processing has been performed, the communication packet is output to the virtual network. Subsequently, the communication packet is input to the address translation device 7d, after which processes to be followed are similar to those of the third embodiment and hence an explanation thereof is omitted.

In addition, even if there exist both actual networks and virtual networks in the networks connected to the repeater 7, appropriate network repeating operation can be carried out by using the above-mentioned technique.

Embodiment 5

In this embodiment, a detailed description will be made to the case in which the repeater in the above-mentioned embodiments has a user authentication function. Specifically, the user authentication function is incorporated or integrated into the repeater, so that ISPs and organizations are separately accommodated in the virtual networks of a commonly accessed device, thereby making it possible to access the device.

Figure 11:
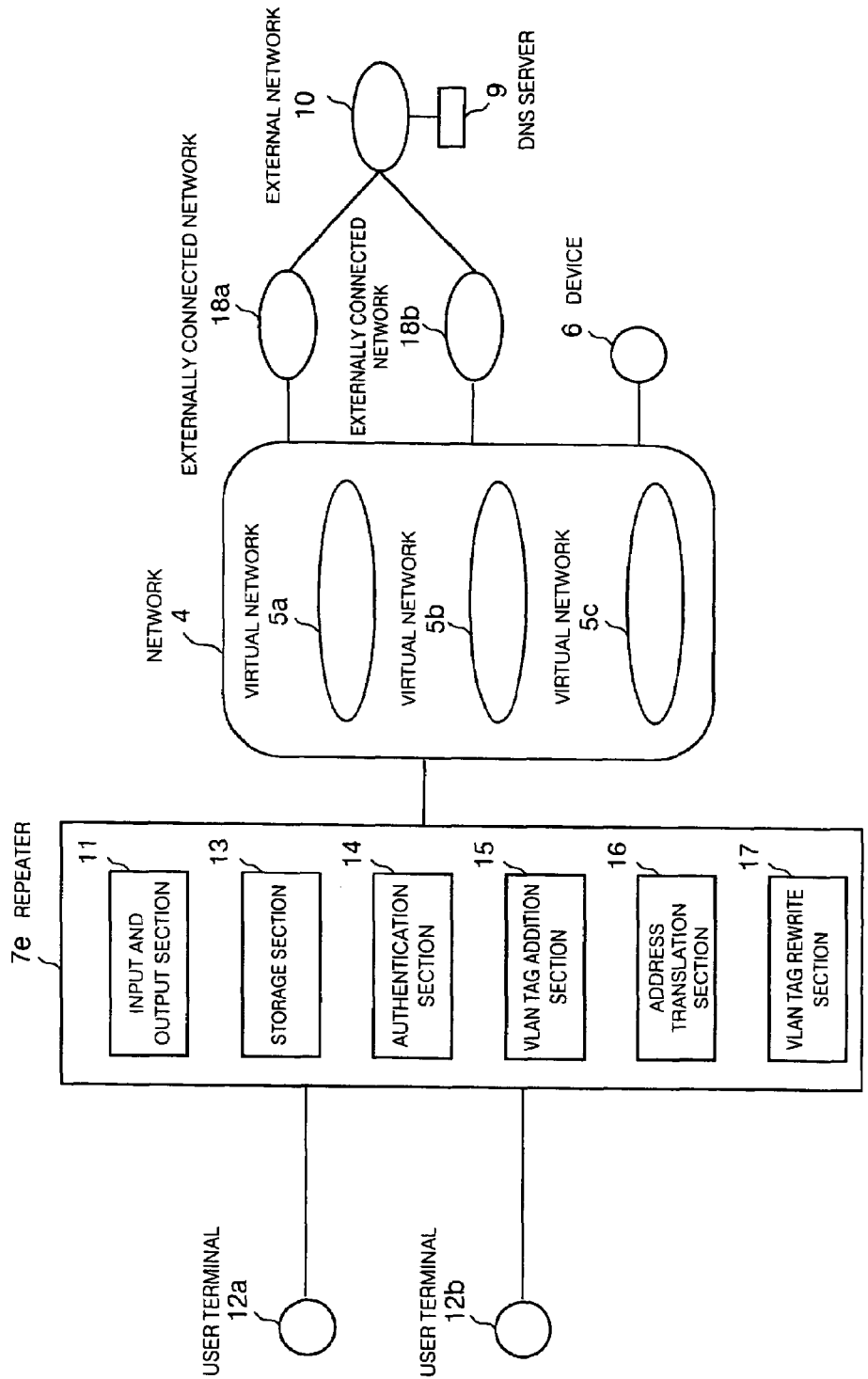
FIG. 11 is a view schematically showing the outline of a network repeater technique according to a fifth embodiment of the present invention.

FIG. 11 is a view that schematically illustrates this embodiment. A repeater 7e illustrated in this figure is configured in such a manner that an authentication section 14 is added to the repeater 7 in the first embodiment.

When the repeater 7e receives a connection request from a user terminal 12a or 12b connected thereto, permission or non-permission of connection is verified by the authentication section 14 so that only communication packets from a terminal that has been authenticated can be handled. In order to accommodate the communication packets from the authenticated terminal in the VLANs in units of ISP or network, the VLAN tag addition processing and the address translation processing are performed, as in the above-mentioned embodiments. The following processes are similar to those of the above-mentioned embodiments, and hence an explanation thereof is omitted.

In cases where this embodiment is specifically applied to a wholesale provider, for example, when taking, as an example, the network 30 of the wholesale provider as shown in FIG. 4, if the repeater 7e in FIG. 11 is applied to the repeater, the repeater can directly receive a connection request from a user terminal and perform authentication operation. As a result, the communication packets can be immediately accommodated in the virtual networks from the user terminal, so that the load on the input network side can be reduced.

Although in this embodiment, the authentication section is incorporated in the repeater, it is needless to say that the authentication section can be externally provided as a separate device so as to cooperate with the repeater.

Although the various embodiments of the present invention have been described above, the present invention is not limited to these embodiments but can of course be changed or modified in any manner without departing from the spirit and scope of the invention.

For example, the repeater of the present invention has no fixed idea or concept for network interfaces or form thereof, and can thus be configured to take the form of a switching hub or a hub with one or more network interfaces, or a computer with one or more ports and its software, or the like. That is, a program to perform the above-mentioned functions on a computer can be executed by being installed, for example, in a storage section, etc., of the repeater, or by being downloaded from a network connected to the repeater. Specifically, network repeating operation is carried out by acquiring and executing programs from storage mediums such as a hard disk provided on the repeater (corresponding to the storage section in the above-mentioned embodiments), or other computer readable recording mediums including a portable storage medium such as a CD-ROM, a flexible disk, a DVD disk, a magneto-optical disk, an IC card or the like, or a database holding therein computer programs, or other computers and their databases, or transmission mediums on a communication line (all of these elements being not illustrated).

In addition, there in no problem that the relation between input and output networks and the repeater of the present invention may include a simple relation such as hubs, switches or bridges, a relation of becoming a router between networks, and a relation of becoming gateways for specific applications without routing. Accordingly, such a repeater function can be implemented by a router.

Moreover, the network interface does not need pairing of an input and an output, and it is possible to constitute a plurality of input/output networks can be configured for one interface by means of virtual networks.

Further, an input-side network can include not only one or more networks but also one or more virtual networks or coexistence of actual networks and virtual networks. As long as networks can be identified by their identifiers, interfaces or the like, there will be no problem even if the addresses of individual input networks duplicate one another. Further, a plurality of input networks can be handled as one network.

On the other hand, an output-side network can also include not only one or more networks but also one or more virtual networks or coexistence of actual networks and virtual networks. In addition, as long as networks can be identified by their identifiers, interfaces or the like, there will be no problem even if the addresses of individual output networks duplicate one another.

It is to be noted that the distribution of VLANs can be made not only according to tag VLANs but also port VLANs. Further, outputs can be made not by distributing them to VLANs but instead by distributing them to one or more networks.

Furthermore, in case where the routing function is not operated, it is possible to inhibit access between input networks.

INDUSTRIAL APPLICABILITY

As described in the foregoing, according to the present invention, communication packets from different networks can be separately accommodated in output networks in which their securities are ensured. In addition, in this state, a common device can be accessed from each input network, so it is possible to provide services from the common device in an environment where there exist a plurality of networks such as for enterprises, schools, wholesale providers, ISPs, etc., in which access between the networks should be inhibited to ensure security. Moreover, since the common device can be accessed if one address is assigned thereto, there is an advantage that it becomes unnecessary to carry out complex setting with respect to one or more DNS servers, etc. Furthermore, since the access to the common device is carried out directly without by way of an external network, it is possible not only to ensure security but also to prevent reduction in access quality which would otherwise result from passing through external networks of low quality.

The invention claimed is:

1. A network repeater apparatus comprising:
   a network repeater connected with a plurality of networks;
   a VLAN tag processing part that performs prescribed VLAN tag processing with respect to a communication packet based on prescribed information of said communication packet when said communication packet is input from any one of said plurality of networks;
   a first address translation part that translates a source address of said communication packet based on said prescribed information, said first address translation part being installed in a prescribed external device;
   a first output part that outputs to a prescribed virtual network a communication packet which has been subjected to at least either one of processing by said VLAN tag processing part or address translation by said first address translation part, and
   wherein said VLAN tag processing part is provided with a VLAN tag addition part that adds a prescribed VLAN tag to said input communication packet, said prescribed information is at least either one of information on a source network of said communication packet or information on a destination of said communication packet, said external device includes:
- an input part to which said communication packet output by said first output part is input;
- a first VLAN tag rewrite part that rewrites a VLAN tag already added to said input communication packet into a prescribed VLAN tag based on said prescribed information of said communication packet input by said input part; and
- a second output part that outputs to said prescribed virtual network a communication packet which has been subjected to at least either one of the processing by said VLAN tag processing part and the address translation by said first address translation part; and said first address translation part translates the source address of said communication packet input by said input part.

2. The network repeater apparatus as set forth in claim 1, wherein said VLAN tag processing part is provided with a second VLAN tag rewrite part that rewrites said VLAN tag, which has already been added to said input communication packet, into a prescribed VLAN tag when a source network of said input communication packet is a virtual network using VLAN tags.

3. The network repeater apparatus as set forth in claim 2, wherein when the destination of said communication packet is a device which is commonly accessed by said plurality of networks, said VLAN tag addition part adds a VLAN tag corresponding to said device to said communication packet.

4. The network repeater apparatus as set forth in claim 2, wherein when the destination of said communication packet is a device which is commonly accessed by said plurality of networks, said first address translation part translates the source address of said communication packet into an address which makes a network corresponding to said device set to be a source network.

5. The network repeater apparatus as set forth in claim 1, further comprising:
- a storage part that stores addresses before and after the translation by said first address translation part in association with each other; and
- a second address translation part that translates a destination of a reply packet to said communication packet based on data stored in said storage part.

6. The network repeater apparatus as set forth in claim 5, wherein said second address translation part translates a destination of a reply packet to said communication packet into the address before the translation stored in said storage part.

7. The network repeater apparatus as set forth in claim 5, wherein said storage part and said second address translation part are installed in a predetermined external device.

8. The network repeater apparatus as set forth in claim 1, wherein said plurality of networks include a virtual network.

9. The network repeater apparatus as set forth in claim 1, further comprising:
- an authentication part that authenticates, upon input of a communication packet from any one of said plurality of networks, a user of the source of said communication packet in each network.

* * * * *